May 23, 1939.  R. O. HELGEBY  2,159,210

SPEEDOMETER POINTER

Filed Dec. 13, 1937

Inventor
Ralph O. Helgeby
By Blackmore, Spencer & Hurd
Attorneys

Patented May 23, 1939

2,159,210

UNITED STATES PATENT OFFICE 2,159,210

SPEEDOMETER POINTER

Ralph O. Helgeby, Flint, Mich., assignor to General Motors Corporation, Detroit, Mich., a corporation of Delaware Application December 13, 1937, Serial No. 179,448

4 Claims. (Cl. 116—129)

This invention relates to measuring instruments and particularly to an instrument combining a speed indicator and a distance recorder as used on vehicles.

An object of the invention is to provide an improved pointer intended for use as a part of the speedometer and constructed to prevent interference with odometer readings.

Specifically the inventive idea is concerned with a counterweight tail piece for the pointer, which tail piece may be dimensioned as desired without interfering with the odometer readings because of its construction from transparent material.

Other objects such as simplicity and economy will be understood from the following description.

Figure 1:
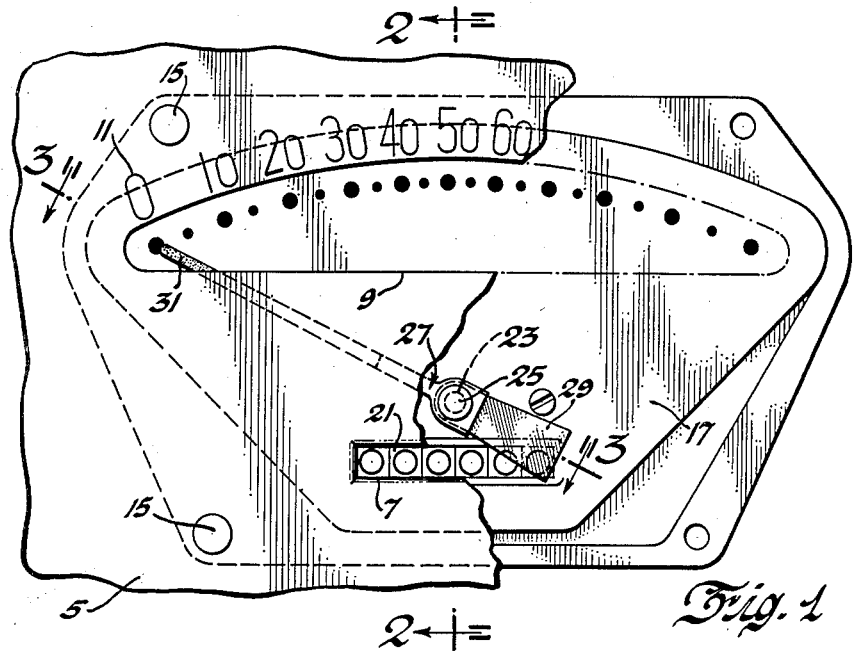
Figure 2:
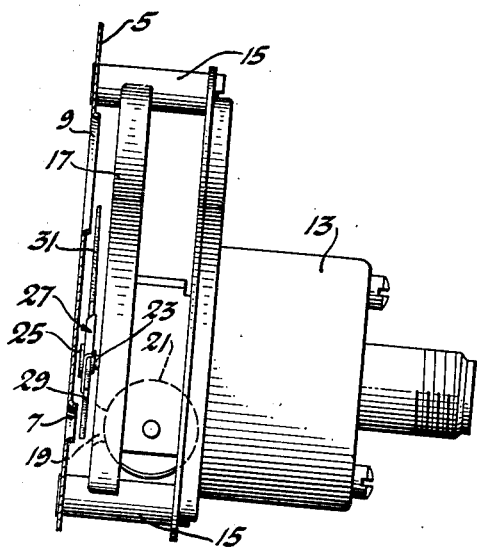
Figure 3:
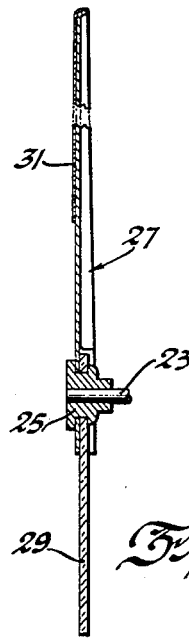

On the drawing is shown one embodiment of the invention, Figure 1 being a front elevation and Figures 2 and 3 being sections on lines 2—2 and 3—3 respectively of Figure 1.

Numeral 5 represents an opaque plate which may be secured in any preferred way over an opening in the instrument panel, the panel itself not being shown. The plate 5 is provided with openings through which are to be seen movable parts associated with the speedometer, odometer, oil pressure gauge and any other instrument which may be mounted adjacent the plate. It is intended that the plate 5 shall be covered by transparent glass through which the instrument readings are made, the glass plate not being shown. The drawing shows only so much of plate 5 as is used for the odometer and speedometer, the plate having an opening 7 for the odometer and an opening 9 for the speedometer. Just above opening 9 the plate 5 is provided with suitable figures extending along an arc, the figures serving to indicate the speed of travel. This arcuate line of figures is marked 11.

The combined speedometer and odometer 13 is secured upon the concealed face of plate 5 by any suitable means such as 15. It includes a front plate 17 through which is cut an opening 19, the latter opening registering with opening 7 in plate 5 whereby the observer may read the figures on the odometer wheels 21. The speedometer has a spindle 23 to which is secured a hub 25. The hub is shouldered to support a pointer 27 preferably of aluminum or some light alloy. The pointer is concealed by the plate 5 except for the portion thereof which is visible through opening 9. Its relation to figures 11 gives the reading of vehicle speed. The pointer may be colored if desired, numeral 31 being used to show the region colored by paint.

Preferably the pointer is made of channel-shape and is enlarged in the region of the hub receiving opening to also receive a separate counterweighting tail piece 29, the hub being shaped as shown to retain the adjacent ends of the pointer and tail piece. The counterweight might be radially short so that it would not move over opening 7 and thus interfere with the odometer reading. However, if made short it would necessarily be relatively heavy. In the present case it is made relatively long so that it need not be heavy but it does move over the opening 7. This tail piece is made of transparent material so that it does not interfere with the odometer reading. It is made fan-shape so that the greater part of its mass is well removed from the axis of rotation at 23. By this construction the pointer is well balanced by the light-weight transparent tail piece 29. The construction of a light-weight metal pointer and a separate transparent tail piece 29 both mounted on the hub of the spindle constitute an efficient and inexpensive pointer.

I claim:

1. A measuring instrument having a first set of indicia and a pointer, said instrument having a rotatable stem, one end of said pointer being mounted on said stem and a transparent counterweight tail piece having one end mounted on said stem and extending diametrically away from the pointer, said instrument having a second set of indicia fixedly located in position and adapted to give readings independently of said pointer, said second set of indicia being visible through said tail piece.

2. The invention defined by claim 1, said transparent counterweight being of fan shape with its narrow portion adjacent the stem.

3. In a measuring instrument having indicia, a rotatable stem, a shouldered hub carried by said stem, a metal pointer having one end secured to said hub and extending radially toward said indicia, a transparent counterweight tail piece also secured to said hub and extending diametrically away from said pointer, said pointer being of channel-shape and one end of said tail piece being received within the channel of the pointer adjacent said hub.

4. In a measuring instrument having a rotatable stem, a pointer carried by said stem and extending radially therefrom, said instrument having a first set of indicia to cooperate with said pointer, a counterweight tail piece for said pointer, said counterweight being separable from said pointer having one end secured to said stem and extending diametrically away from said pointer, said instrument having a second set of fixedly located indicia, said counterweight being of transparent material whereby it may be made of such length as to pass over said second set of indicia which are visible therethrough.

RALPH O. HELGEBY.